US006985743B2

(12) United States Patent
Bajikar (10) Patent No.: US 6,985,743 B2
(45) Date of Patent: Jan. 10, 2006

(54) METHOD AND APPARATUS FOR AN INDEPENDENT POSITIONING SYSTEM AND AUGMENTATION OF GPS

(75) Inventor: Sundeep Bajikar, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 560 days.

(21) Appl. No.: 09/811,277

(22) Filed: Mar. 16, 2001

(65) Prior Publication Data

US 2002/0082024 A1 Jun. 27, 2002

Related U.S. Application Data

(63) Continuation-in-part of application No. 09/752,506, filed on Dec. 27, 2000.

(51) Int. Cl.
*H04Q 7/20* (2006.01)

(52) U.S. Cl. .............................. 455/456.1; 455/404.2; 455/41.2; 342/357.01; 342/357.06

(58) Field of Classification Search ............... 455/41.2, 455/56.2, 91, 95, 404.2, 456.1–456.3, 456.5, 455/3.02, 13.2, 12.1, 13.1, 24, 409.2, 414.1, 455/414.2, 457, 73, 88, 553.1, 69, 78; 342/357.01–16; 375/219
See application file for complete search history.

(56) References Cited

U.S. PATENT DOCUMENTS

| 5,589,838 | A | * | 12/1996 | McEwan .................... 342/387 |
| 5,790,076 | A | * | 8/1998 | Sypniewski ................. 342/365 |
| 5,850,609 | A | * | 12/1998 | Sugarbroad et al. ..... 455/456.1 |
| 6,031,487 | A | | 2/2000 | Mickelson |
| 6,101,178 | A | * | 8/2000 | Beal ........................... 370/336 |
| 6,140,958 | A | * | 10/2000 | Johnson et al. ........ 342/357.09 |
| 6,275,707 | B1 | * | 8/2001 | Reed et al. ............... 455/456.3 |
| 6,326,926 | B1 | * | 12/2001 | Shoobridge et al. ........ 343/702 |
| 6,405,132 | B1 | * | 6/2002 | Breed et al. ................ 701/301 |
| 6,449,558 | B1 | * | 9/2002 | Small ......................... 701/213 |
| 2001/0002211 | A1 | * | 5/2001 | Lee ............................ 379/414 |
| 2004/0201277 | A1 | * | 10/2004 | Hentsch et al. ............ 307/10.1 |

FOREIGN PATENT DOCUMENTS

| EP | 0 588 598 | 3/1994 |
| WO | WO 97 28455 A | 8/1997 |
| WO | WO 99 48233 A | 9/1999 |
| WO | WO 00 75682 A | 12/2000 |
| WO | PCT/US01/43802 | 9/2002 |

OTHER PUBLICATIONS

Tariq, F., et al., "Robust and Scalable Matching Pursuits Video Transmission Using the Bluetooth Air Interface Standard", vol. 46, No. 3, Aug. 2000, pp. 673–681, IEEE Transactions On Consumer Electronics, IEEE Inc., New York.

Sosnovsky, A.A., "Aviatsionnaya Radionavigatsia. Spravochnik" (Aviation Radio Navigation. Reference Book), Moscow, Transport Publishers, 1990, pp. 44–48.

Yarlykov, M.S. and Bazarov, A.A., "Sovmeschennaya Apparatura Potrebitelei Sputnikovoi I Giperbolisheskoi Rationavigatsionnykh Sistem" (Matched Equipment for Users of Satellite and Hyperbolic Radio Navigation Systems), "Radioteknika" (Radio Engineering), No. 46, 1992, pp. 3, 13.

* cited by examiner

Primary Examiner—CongVan Tran
(74) Attorney, Agent, or Firm—Blakely, Sokoloff, Taylor & Zafman LLP (57) ABSTRACT

A method and an apparatus for a positioning system and augmentation of a global positioning system (GPS) are provided. The system includes at least one transmitter and at least one transceiver. The transceiver is able to calculate a position of the transceiver relative to the transmitter using information sent by the transmitter to the transceiver.

25 Claims, 11 Drawing Sheets

METHOD AND APPARATUS FOR AN INDEPENDENT POSITIONING SYSTEM AND AUGMENTATION OF GPS

REFERENCE TO RELATED APPLICATIONS

This is a continuation-in-part of currently pending application No. 09/752,506, filed Dec. 27, 2000.

FIELD OF THE INVENTION

The present invention relates generally to the field of positioning systems and, more particularly, to a method and apparatus for an independent positioning system and augmentation of the global positioning system (GPS).

BACKGROUND OF THE INVENTION

There are many devices today that utilize the technology of the global positioning system The global positioning system (GPS) is based on a constellation of twenty-four satellites orbiting around the earth that broadcast precise data signals. A single GPS receiver is capable of receiving these signals and can calculate its position (latitude and longitude), altitude, velocity, heading and precise time of day using data signals from at least four GPS satellites. Thus, these GPS receivers can locate themselves anywhere on the planet where a direct view of the GPS satellites is available.

Each satellite transmits two signals, an L1 signal and an L2 signal. The L1 signal is modulated with two pseudo-random noise codes, the protected code and the course/acquisition (C/A) code. Each satellite has its own unique pseudo-random noise code. Civilian navigation receivers only use the C/A code on the L1 frequency. In a positioning device that utilizes the GPS, a GPS receiver measures the time required for the signal to travel from the satellite to the receiver. This done by the GPS receiver generating a replica of the pseudo-random noise code transmitted by the satellite and precisely synchronizing the two codes to determine how long the satellite's code took to reach the GPS receiver. This process is carried out with at least four satellites so that any error in the calculation of position and time is minimized.

A positioning device utilizing GPS is an effective tool in finding a location or determining a position. However, a device utilizing GPS has many limitations. One significant limitation is that GPS is generally unsuitable for indoor positioning applications since a direct view of the GPS satellites is not available. Therefore, it is desirable to have an independent positioning system utilizing technology other than the GPS or working in conjunction with GPS that is functional indoors and in other locations where GPS is not functional.

Another problem with GPS systems is that many types of errors are inherent to the physics of transmission of the data signal from the GPS satellite down to the earth. For instance, ephemeric errors are errors caused by gravitational pulls on the satellites from the moon, sun, and the pressure of solar radiation. These errors affect the satellite's orbit. Other types of errors include ionospheric and tropospheric errors. A GPS receiver with this type of information may use this information to calculate position and time with greater accuracy. Therefore, it is desirable to have a positioning system utilizing technology in conjunction with GPS that supplies augmentation data to help GPS receivers correct errors that may occur in calculating time and location.

BRIEF DESCRIPTION OF THE DRAWINGS

The present invention is illustrated by way of example, and not limitation, in the figures of the accompanying drawings in which.

DETAILED DESCRIPTION

A method and an apparatus for an independent positioning system and augmentation of a global positioning system (GPS) are described. In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention. There are several different ways to implement an independent positioning system. Several embodiments are described herein. However, there are other ways that would be apparent to one skilled in the art that may be practiced without specific details.

Figure 1:
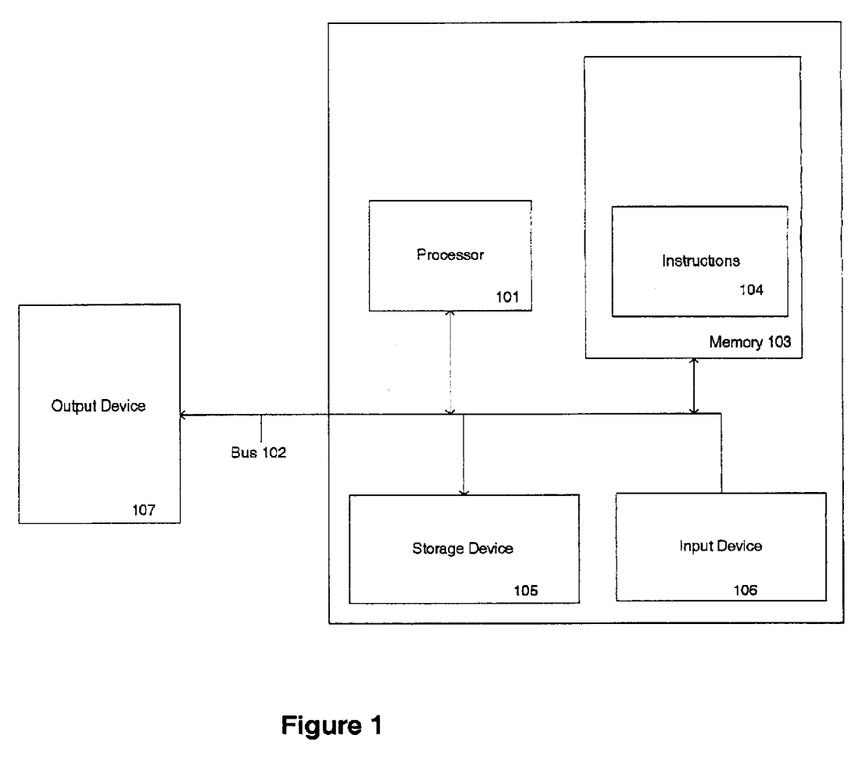
FIG. 1 illustrates an example of one embodiment of a computer system.

The method and apparatus disclosed herein may be integrated into advanced Internet—or network-based knowledge systems as related to information retrieval, information extraction, and question and answer systems. FIG. 1 illustrates an example of one embodiment of a computer system. The system shown has a processor 101 coupled to a bus 102. Also shown coupled to the bus 102 is a memory 103 which may contain instructions 104. Additional components shown coupled to the bus 102 are a storage device 105 (such as a hard drive, floppy drive, CD-ROM, DVD-ROM, etc.), an input device 106 (such as a keyboard, mouse, light pen, bar code reader, scanner, microphone, joystick, etc.), and an output device 107 (such as a printer, monitor, speakers, etc.). Of course, an exemplary computer system could have more components than these or a subset of the components listed.

The method described above can be stored in the memory of a computer system (e.g., set top box, video recorders, etc.) as a set of instructions to be executed, as shown by way of example in FIG. 1. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.).

Figure 2:
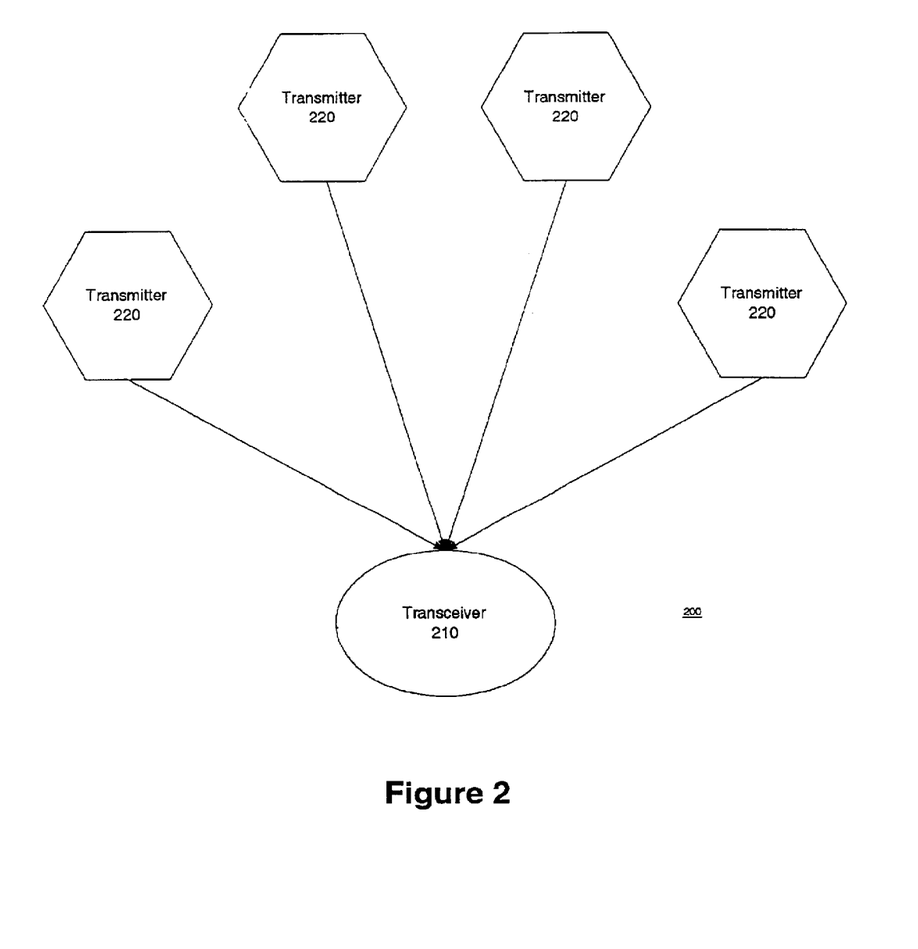
FIG. 2 illustrates an embodiment of an independent positioning system.

FIG. 2 illustrates an embodiment of a stand-alone positioning system 200. The positioning system 200 comprises at least one transceiver 210 and at least one transmitter 220. In FIG. 2, one transceiver 210 and four transmitters 220 are shown. The transceiver 210 determines its position relative to the four transmitters 220. In alternative embodiments, more than four transmitters may be used. The transmitters 220 may be manually installed anywhere for this system 200 to function. An example of such an application is a building that has four transmitters installed in the four corners of the building. As a transceiver moves around the building, the position of that transceiver can be calculated relative to the transmitters. In another example, automobiles equipped with a transceiver and a transmitter can establish a relative positioning framework with respect to one another. This would establish a "virtual bumper" where the "virtual bumper" provides an area of safety around each vehicle, and each vehicle can avoid collision by using the virtual bumper and distance information of the other vehicles.

Figure 3:
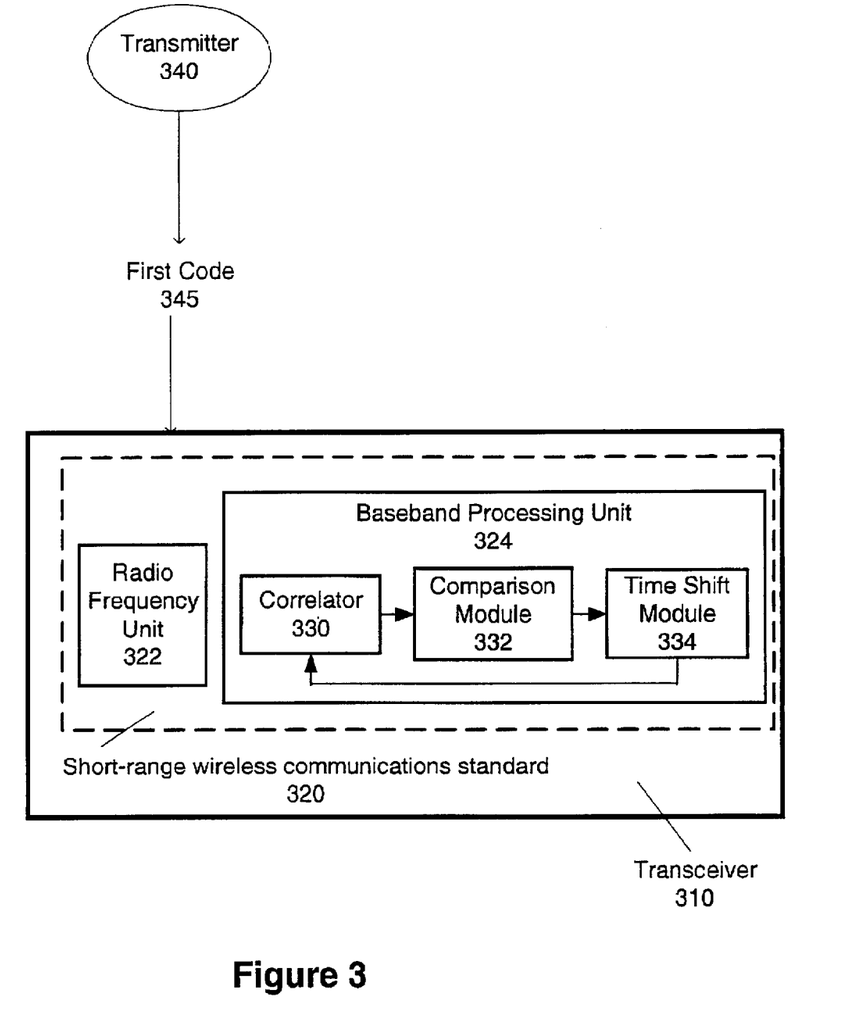
FIG. 3 illustrates a block diagram of an embodiment of a transceiver.

FIG. 3 illustrates an embodiment of a transceiver. The transceiver 310 includes a radio frequency unit 322 and a base-band processing unit 324. The radio frequency unit 322 and the baseband processing unit 324 are a part of a short-range wireless communications standard 320 of the transceiver 310. The transceiver 310 receives a first code 345 from a transmitter 340 via the short-range wireless communications standard 320. The first code 345 is received by the radio frequency unit 322 of the transceiver 310. The transceiver 310 generates a second code to correspond to that first code 345. In one embodiment, the first code 345 and the second code are noise codes. In alternative embodiments, the codes may be another type of signal.

In one embodiment, a correlator 330 multiplies the two codes together, and a comparison module 332 determines if there is a correlation peak. A time shift module 334 shifts the two codes in time to determine a time shift between the codes. The time shift is used to determine the distance between the transceiver and the transmitter.

The transceiver can use three first codes transmitted by three transmitters to determine its 3-dimensional position with respect to the three transmitters. However, using this type of calculation, the accuracy would be greater if at least four transmitters are used by the transceiver to determine its position. This would correct any errors with respect to the time measurements used by the transceiver. In alternative embodiments, other types of calculation methods may be used to determine the transceiver's position relative to the transmitter.

In one embodiment the short-range wireless communications standard is a Bluetooth™ standard. Bluetooth™ is a protocol of a short-range (10 meter) frequency-hopping radio link between devices. A device using a Bluetooth™ standard eliminates the need for wires and cables while allowing for data and voice communication interaction between that device and another device using the Bluetooth™ standard. Bluetooth™ technology supports point to multiple point connections so that up to seven devices can be set to communicate with one controller device and with each other. This is called a piconet and several of these piconets can be established and linked together to form scatternets to allow communication among these configurations. In one embodiment, several transceivers using the Bluetooth™ standard can determine position information by communicating with several transmitters also using the Bluetooth™ standard and with each other.

In an alternative embodiment, the short-range wireless communications standard is an IEEE 802.11b standard. The IEEE 802.11b standard is a wireless local area network (LAN) standard developed by the Institute of Electrical and Electronic Engineering (IEEE) committee in order to specify an "over the air" interface between a wireless client and a base station or access point, as well as among wireless clients. A wireless LAN (WLAN) is a data transmission system designed to provide location-independent network access between computing devices by using radio waves rather than a cable infrastructure. In one embodiment, the transceivers could use the IEEE 802.11b standard to communicate with transmitters using the IEEE 802.11b standard and with each other to determine position relative to the transmitters.

Figure 4:
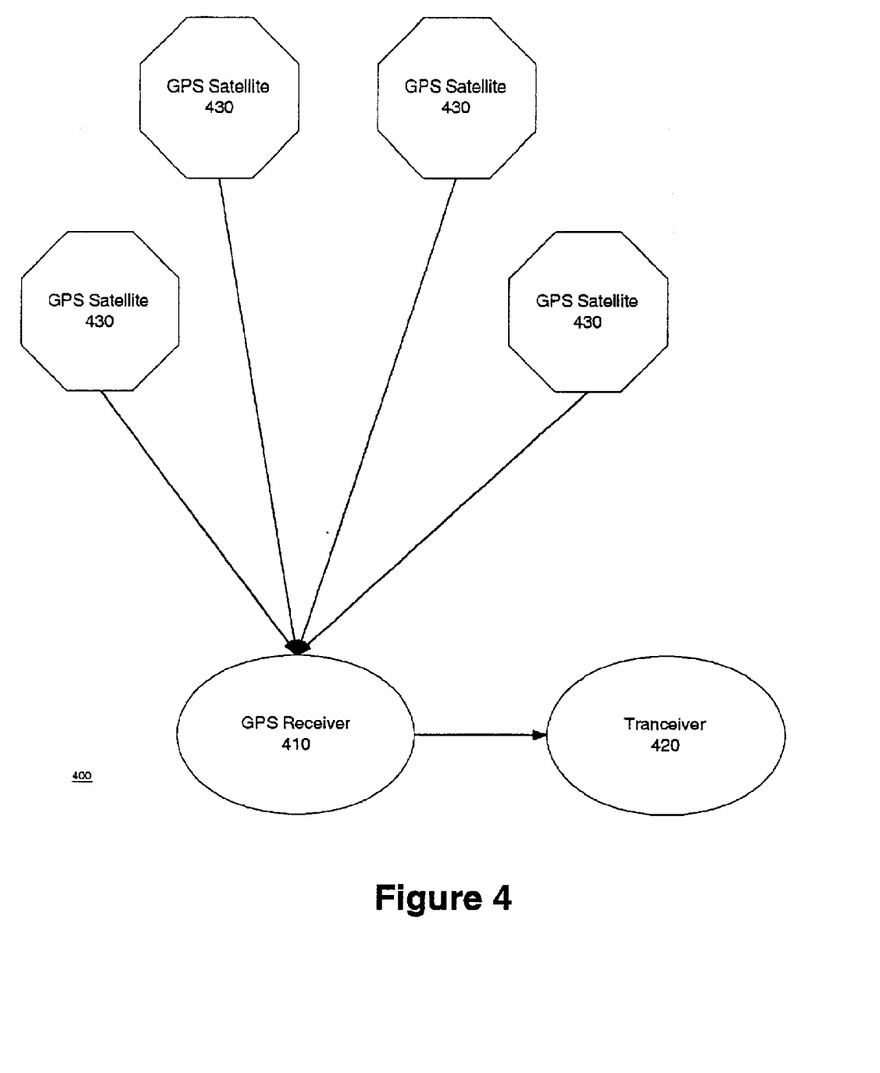
FIG. 4 illustrates an embodiment of a positioning system.

FIG. 4 illustrates an alternative embodiment of a positioning system 400. This positioning system 400 incorporates a global positioning system (GPS) with an independent positioning system In this embodiment, A GPS receiver 410 receives psuedo-random noise codes from any number of GPS satellites 430. The GPS receiver 410 relays the codes to a transceiver 420. The transceiver is capable of using the GPS codes to determine its position relative to the GPS satellites.

Figure 5:
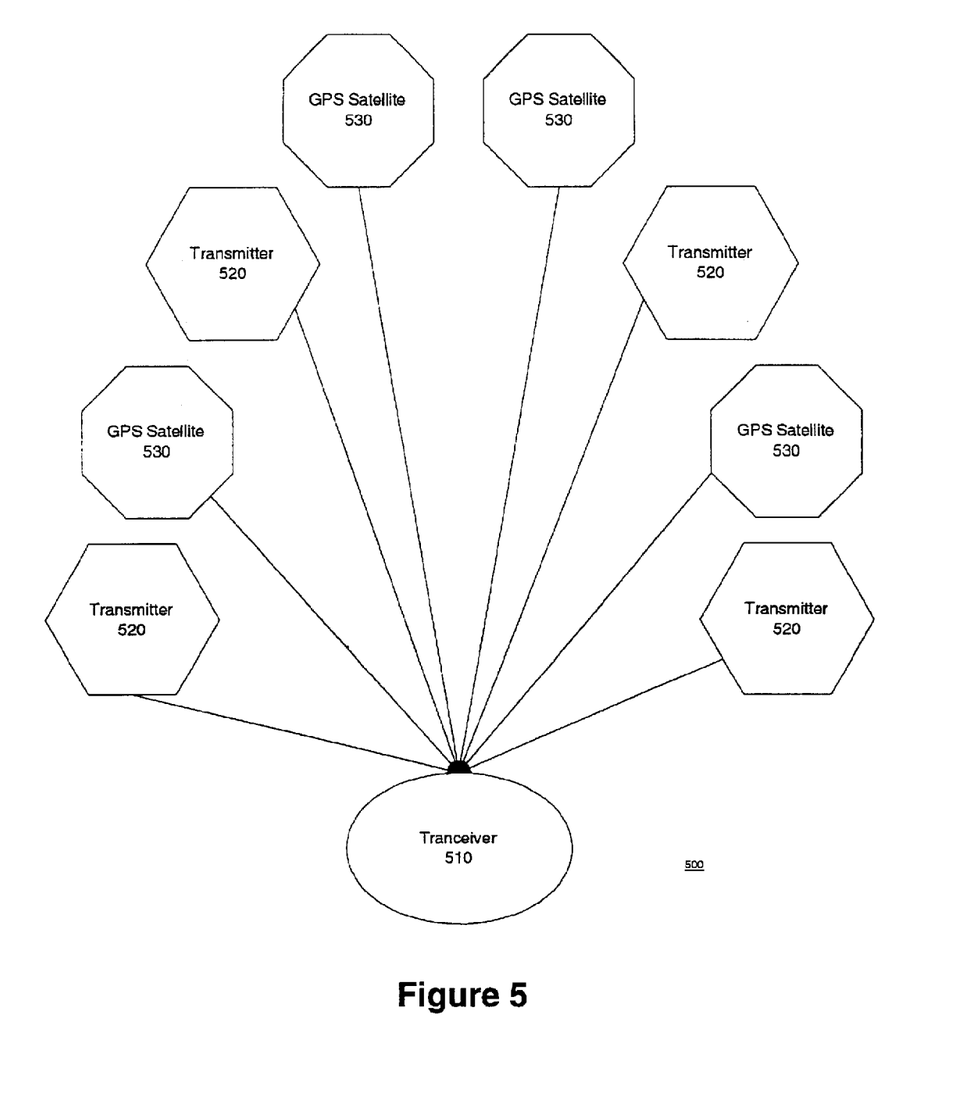
FIG. 5 illustrates an alternative embodiment of a positioning system.
Figure 6:
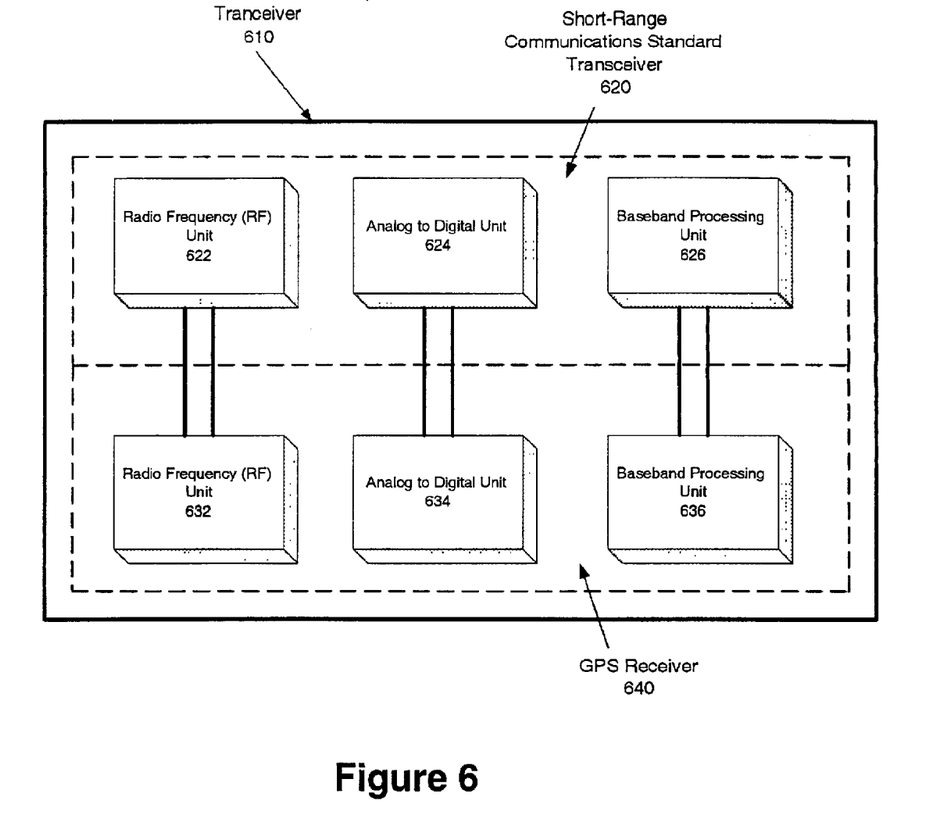
FIG. 6 illustrates a diagram of an alternative embodiment of a transceiver.

FIG. 5 illustrates another alternative embodiment of a positioning system 500. This positioning system 500 incorporates a global positioning system (GPS) with an independent positioning system. The positioning system 500 comprises at least one transceiver 510, a number of transmitters 520, and a number of GPS satellites 530. In FIG. 5, four transmitters and four GPS satellites are shown. The transceiver 510 determines its position relative to the transmitters 520 and the GPS satellites 530. In alternative embodiments, any number of transmitters and GPS satellites may be used by the transceiver to determine its position. An example of this type of application would be a plurality of buildings that have transmitters installed in each building. A user traveling with a transceiver would be able to visit each building and determine the position of the transceiver by using information from both the transmitters and the GPS satellites. As the user travels outside with the transceiver, the GPS satellites may be used to determine the location of the transceiver. Inside each building, the location of the transceiver may be determined using the position calculated with information from the GPS satellites and combining that position with information from the transmitters in that building. This would allow the transceiver to establish a new position of the transceiver within that building. Thus, the user is able to determine a new position while traveling between buildings as well as in each building, and this is done using both the GPS and the independent positioning system FIG. 6 illustrates an embodiment of a transceiver 610. In this embodiment, certain components of a short-range communications standard transceiver 620 and a GPS receiver 640 are combined to implement a positioning system that uses both a GPS system and an independent positioning system The short-range communications standard transceiver 620 comprises a radio frequency (RF) unit 622, an analog to digital unit 624, and a baseband processing unit 626. The GPS receiver 640 comprises a radio frequency (RF) unit 632, an analog to digital unit 634, and a baseband processing unit 636. In the embodiment shown in FIG. 6, parallels may be drawn between these units in order to form one transceiver 610. Diagrams of specific architecture of a transceiver may be seen in FIGS. 8 and 9.

Figure 7:
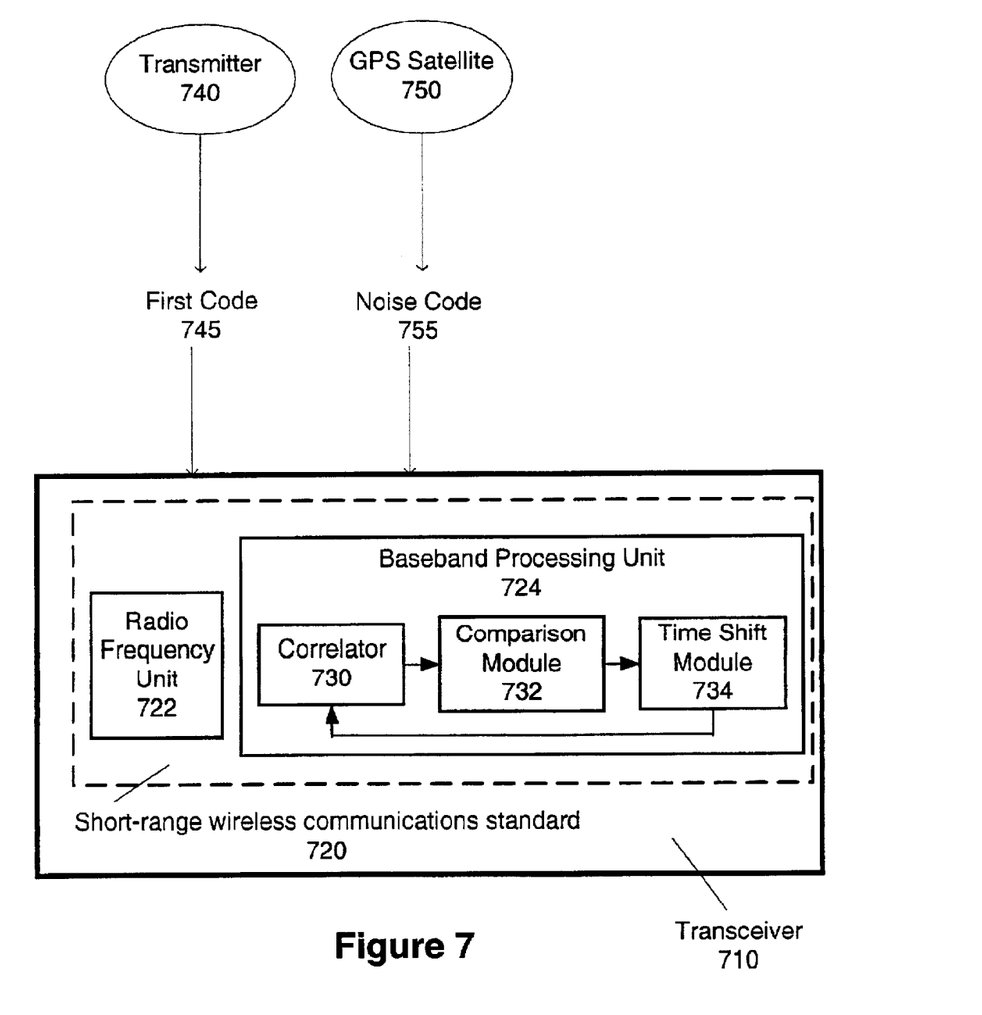
FIG. 7 illustrates a block diagram of an alternative embodiment of a transceiver.

FIG. 7 illustrates a block diagram of an alternative embodiment of a transceiver. The positioning system incorporates a GPS system and an independent positioning system that uses a short-range communications standard. The transceiver 710 comprises a radio frequency (RF) unit 722 and a base band processing unit 724. The transceiver 710 receives a first code 745 from a transmitter 740 via the short-range wireless communications standard. The first code 745 is received by the radio frequency unit 722 of the transceiver 710. The transceiver 710 generates a second code to correspond to that first code 745.

In one embodiment, a correlator 730 multiplies the two codes together, and a comparison module 732 determines if there is a correlation peak. A time shift module 734 shifts the two codes in time to determine a time shift between the codes. The time shift is used to determine the distance between the transceiver and the transmitter.

Similarly, the transceiver 710 receives a first noise code 755 from a GPS satellite 750. The transceiver 710 generates a second noise code to correspond to the noise code 755 and uses these codes to determine the position of the transceiver 710 relative to the GPS satellite 750.

In one embodiment, the transceiver can use three first codes transmitted by three transmitters to determine its 3-dimensional position with respect to the three transmitters. Similarly, the transceiver can use three noise codes transmitted by three GPS satellites to determine its 3-dimensional position with respect to the three GPS satellites. However, using this type of calculation, the accuracy would be greater if at least four transmitters and at least four GPS satellites are used by the transceiver to determine its position. This would correct any errors with respect to the time measurements used by the transceiver. In alternative embodiments, other types of calculation methods may be used to determine the transceiver's position relative to the transmitters and GPS satellites.

In one embodiment, augmentation data may also be exchanged between the GPS system and a short-range wireless communications interface on a transceiver. This information can include, but is not limited to differential corrections, wide area augmentation system (WAAS) corrections, satellite ephemeris data, doppler shift estimates, satellite snapshot data, and terrain maps. This type of augmentation data may allow the transceiver to track weaker signals from the transmitters of the stand-alone positioning system as well as the signals from the GPS satellites.

In one embodiment, the positioning system may be combined with other networks or systems. An example of this type of combination is a positioning system combined with an Inertial Navigation System (INS). Generally, an INS includes one or more accelerometers, gyroscopes, and/or inclinometer sensors. A positioning system in combination with INS may determine the position of the transceiver using information from the transmitters as well as following the trajectory of the transceiver as it moves. In one embodiment, the transceiver can reinitialize its position when the transceiver is close to another transceiver to avoid errors created by the INS.

Figure 8:
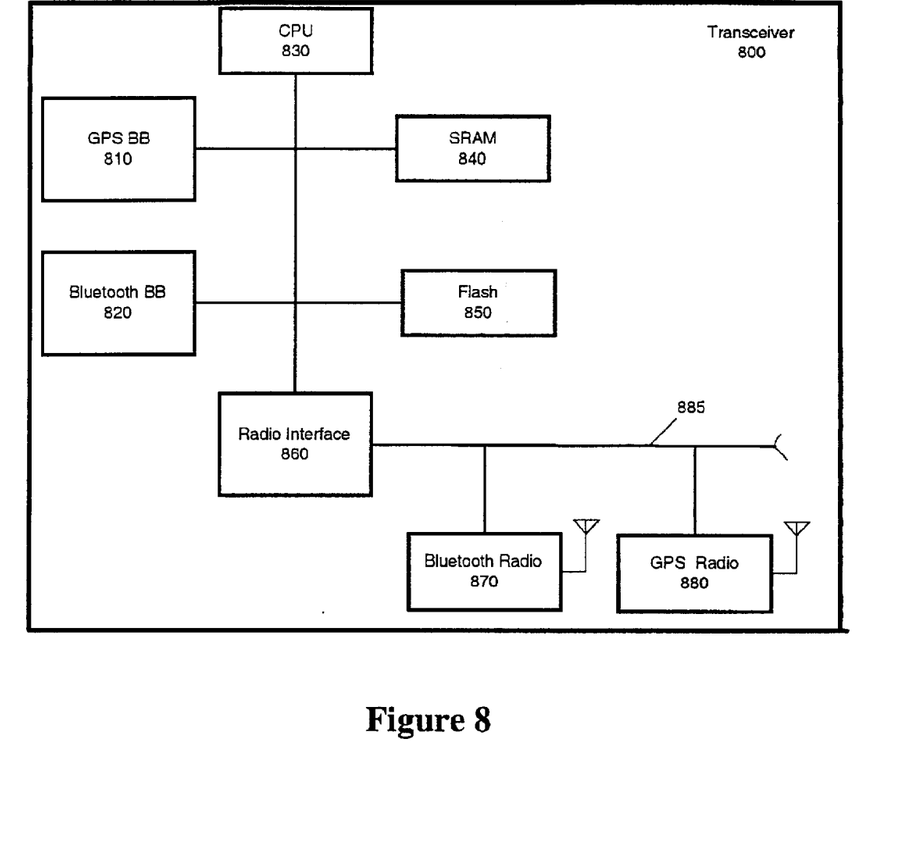
FIG. 8 illustrates an architecture of one embodiment of a transceiver.

FIG. 8 illustrates the architecture of one embodiment of a transceiver 800. In this embodiment, a radio interface 860 is coupled to both a Bluetooth radio 870 and a GPS radio 880 via a bus 885. In this architecture, the signal moves through the radio interface 860 to the corresponding base band processing unit. The radio interface 860 is share by a GPS base band processing unit (BB) 810 and a Bluetooth BB 820. The GPS BB 810 and Bluetooth BB 820 also share other components such as the Central Processing Unit (CPU) 830, the static random access memory (SRAM) 840, and the flash 850 in this embodiment. Accordingly, this architecture separates the radios from the base band units and allows for shared components.

Figure 9:
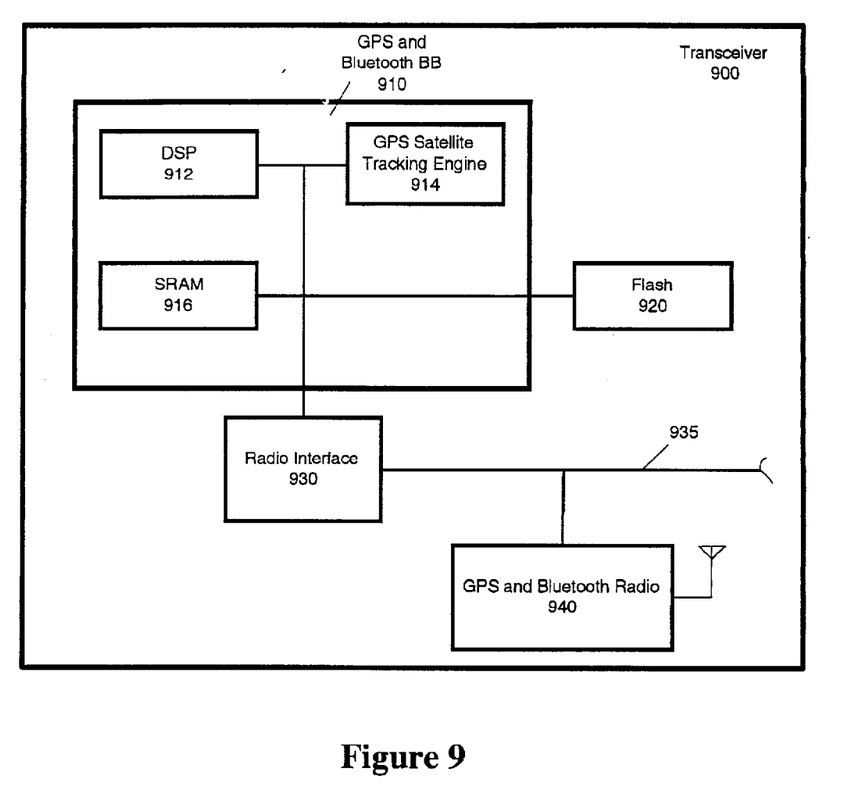
FIG. 9 illustrates an architecture of an alternative embodiment of a transceiver.

FIG. 9 illustrates the architecture of an alternative embodiment of a transceiver 900. In this embodiment, the GPS and Bluetooth radios are combined into one GPS and Bluetooth Radio 940. The signal moves through the radio interface 930 to a GPS and Bluetooth BB 910 via a bus 935. In this architecture, a digital signal processor (DSP) 912 is used in conjunction with a GPS satellite tracking engine 914 instead of a CPU. This results in an optimization of hardware such that there is no need for a separate GPS BB. The architecture also includes a flash 920 memory and an SRAM 916.

Figure 10:
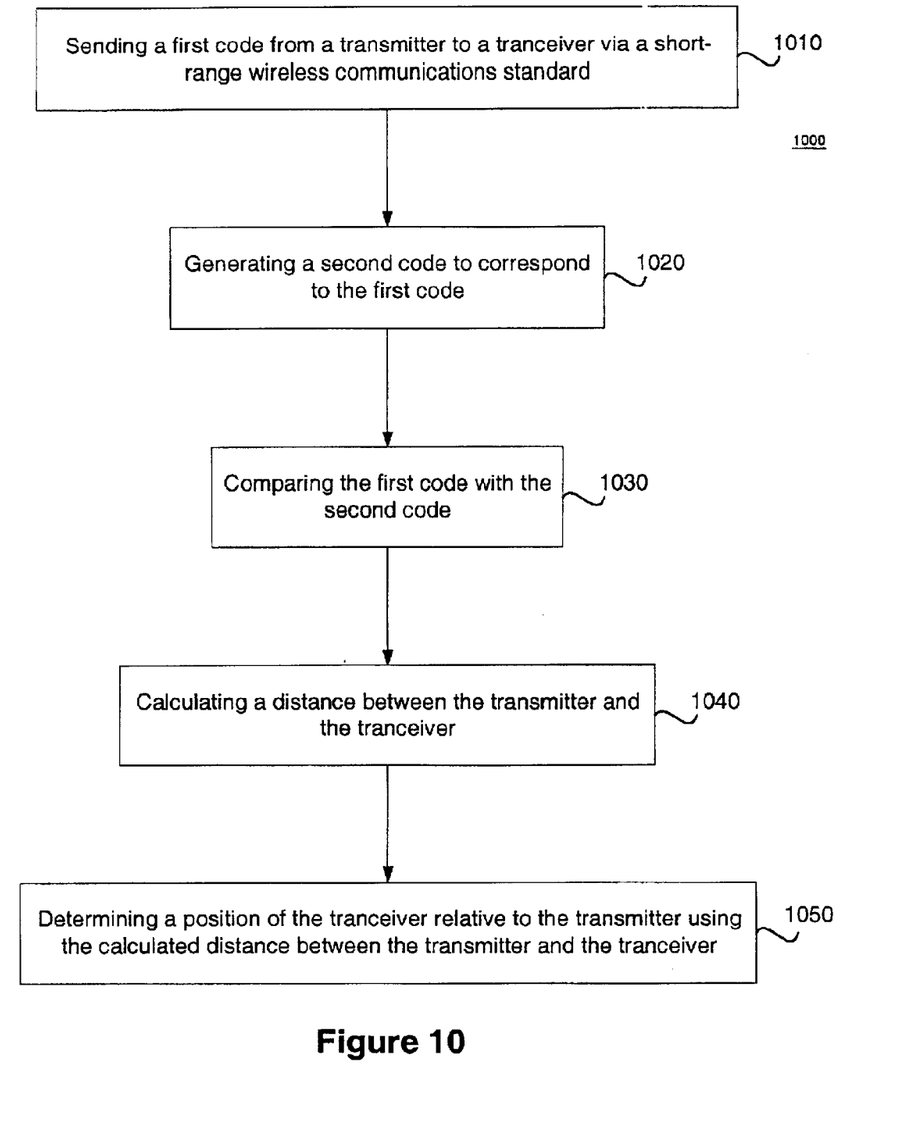
FIG. 10 illustrates a flow chart of a process of determining a position of a transceiver.

FIG. 10 illustrates a flowchart of a process of determining a position of a transceiver. Step 1010 includes sending a first code from a transmitter to a transceiver via a short-range wireless communications standard. In steps 1020 and 1030, the transceiver generates a second code to correspond to the first code and compares the first code with the second code. Step 1040 involves calculating a distance between the transmitter and the transceiver. Step 1050 is determining a position of the transceiver relative to the transmitter using the calculated distance between the transmitter and the transceiver.

Figure 11:
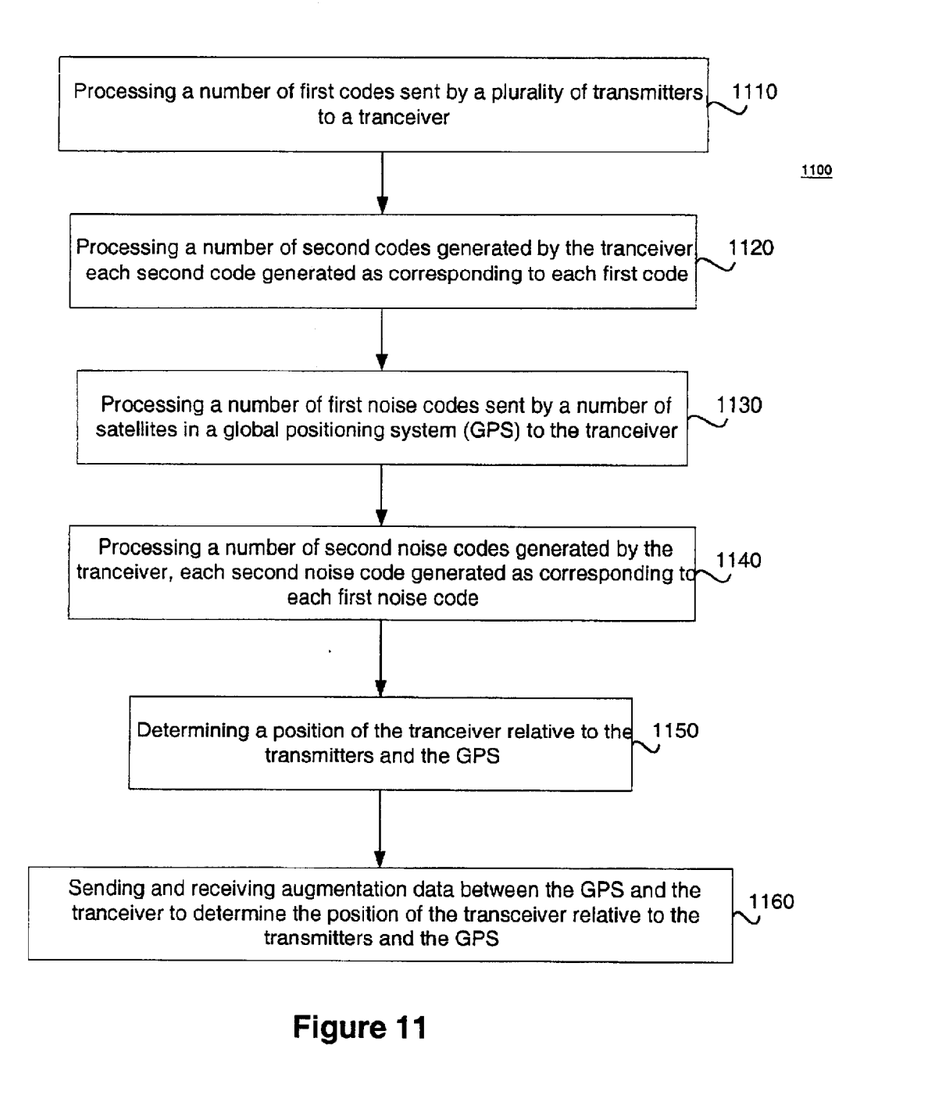
FIG. 11 illustrates a flow chart of an alternative process of determining a position of a transceiver.

FIG. 11 illustrates a flowchart of an alternative process of determining a position of a transceiver. Step 1110 includes processing a number of first codes sent by a plurality of transmitters to a transceiver. Step 1120 includes processing a number of second codes generated by the transceiver. Each second code corresponds to a first code. In steps 1130 and 1140, the transceiver processes a number of first noise codes sent by GPS satellites to the transceiver and a number of second noise codes generated by the transceiver. The second noise codes correspond to the first noise codes. A position of the transceiver relative to the transmitters and GPS satellites is determined in step 1150. In step 1160, augmentation data is exchanged between the transceiver and the GPS to determine the position of the transceiver relative to the transmitters and GPS satellites.

A method and an apparatus for a positioning system and augmentation of GPS have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. An apparatus comprising:
    a transceiver to receive a first set of codes from multiple separate transmitters via a short-range wireless Bluetooth™ communications standard, the transceiver to generate a second code; and
    a correlator on the transceiver to uses the first set of codes and the second code to find a distance between the transceiver and the transmitter, the correlator using the distance to determine a position of the transceiver relative to the transmitter.

2. The apparatus of claim 1 wherein the transceiver to receive the first set of codes from at least four different transmitters, the transceiver to use the first set of codes to determine a position of the transceiver relative to the four transmitters.

3. The apparatus of claim 1 wherein the transceiver further comprises a radio frequency unit with a radio and a baseband processing unit.

4. The apparatus of claim 3 wherein the radio frequency unit of the transceiver to receive the first set of codes sent by the transmitters.

5. The apparatus of claim 3 wherein the baseband processing unit processes a noise code received from a satellite in a global positioning system (GPS), the transceiver to use the noise code to determine a position of the transceiver relative to the satellite.

6. The apparatus of claim 5 wherein the transceiver includes a short-range wireless communication interface to exchange augmentation data with the GPS.

7. The apparatus of claim 6 wherein the augmentation data is selected from the group consisting of differential corrections, wide area augmentation system (WAAS) corrections, satellite ephemeris data, doppler shift estimates, satellite snapshot data, and terrain maps.

8. The apparatus of claim 1 wherein the short-range wireless communications standard is IEEE 802.11b.

9. The apparatus of claim 1 wherein the first set of codes and the second code are noise codes.

10. A system comprising:
a set of transmitters to transmit a first set of codes corresponding to the transmitters via a short-range wireless Bluetooth™ communications standard;
a transceiver having a radio frequency (RF) unit with a radio to receive the first set of codes, the transceiver to generate a second code;
a baseband processing unit on the transceiver, the baseband processing unit to process a noise code received from a satellite in a global positioning system (GPS); and
a correlator on the transceiver to uses the first set of codes and the second code to find a distance between the transceiver and the transmitter, the correlator to use the distance to determine a position of the transceiver relative to the transmitters, and the correlator to determine a second distance between the transceiver and the satellite in order to determine a second position of the transceiver relative to the satellite.

11. The system of claim 10 wherein the transceiver to receive the first set of codes from at least four different transmitters, the transceiver using the first set of codes to determine a position of the transceiver relative to the four transmitters.

12. The system of claim 10 wherein the transceiver is to receive GPS noise codes from at least four different satellites, the transceiver to use the GPS noise codes to determine a position of the transceiver relative to the four satellites.

13. The system of claim 12 wherein the transceiver includes a short-range wireless communication interface to exchange augmentation data with the GPS.

14. The system of claim 13 wherein the augmentation data is selected from the group consisting of differential corrections, wide area augmentation system (WAAS) corrections, satellite ephemeris data, doppler shift estimates, satellite snapshot data, and terrain maps.

15. The system of claim 10 wherein the short-range wireless communications standard is IEEE 802.11 b.

16. The system of claim 10 wherein the first set of codes and the second code are noise codes.

17. A method comprising:
sending a first set of codes from a set of transmitters to a transceiver via a short-range wireless Bluetooth™ communications standard;
generating a second code to correspond to the first set of codes;
comparing the first code with the second code;
calculating a distance between the transmitters and the transceiver; and
determining a position of the transceiver relative to the transmitters using the calculated distance between the transmitter and the transceiver.

18. The method of claim 17 further comprising the steps of:
receiving first codes from at least four different transmitters; and
determining a position of the transceiver relative to the four transmitters.

19. The method of claim 17 further comprising the steps of:
sending noise codes from a satellite in a global positioning system (GPS) to the transceiver; and
processing the noise code to determine a position of the transceiver relative to the satellite.

20. The method of claim 19 wherein the step of processing the noise code is done by a baseband processing unit of the transceiver.

21. The method of claim 19 further comprising the steps of:
receiving noise codes from at least four satellites; and
determining the position of the transceiver relative to the four satellites.

22. The method of claim 21 further comprising the step of exchanging augmentation data between the GPS and a short-range wireless communications interface on the transceiver.

23. The method of claim 22 wherein the augmentation data is selected from the group consisting of differential corrections, wide area augmentation system (WAAS) corrections, satellite ephemeris data, doppler shift estimates, satellite snapshot data, and terrain maps.

24. The method of claim 17 wherein the short-range wireless communications standard is IEEE 802.11b.

25. The method of claim 17 wherein the first set of codes and the second codes are noise codes.

* * * * *